No. 623,819. Patented Apr. 25, 1899.
E. A. PARRISH.
DUMPING CART OR WAGON.
(Application filed Mar. 16, 1899.)
(No Model.)
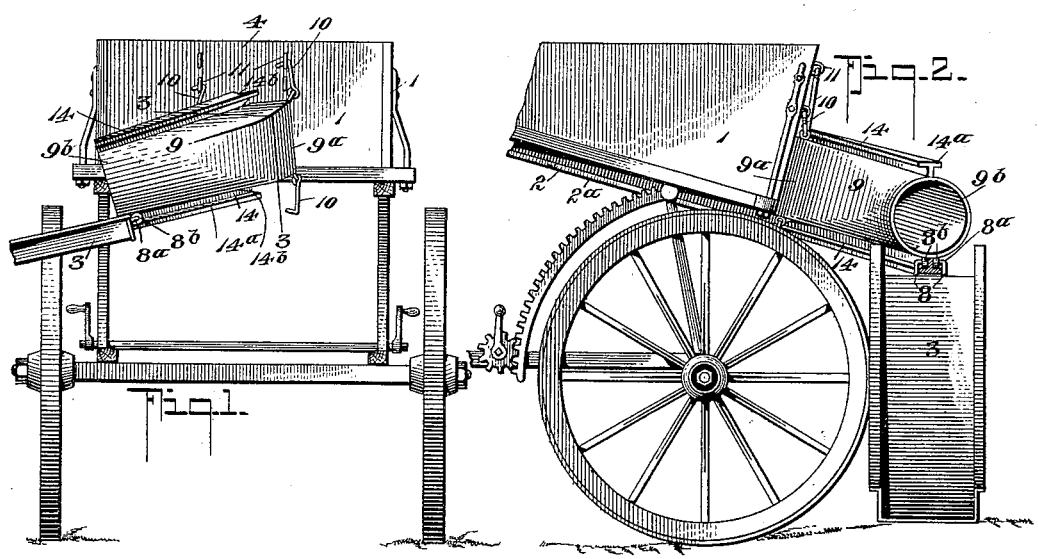
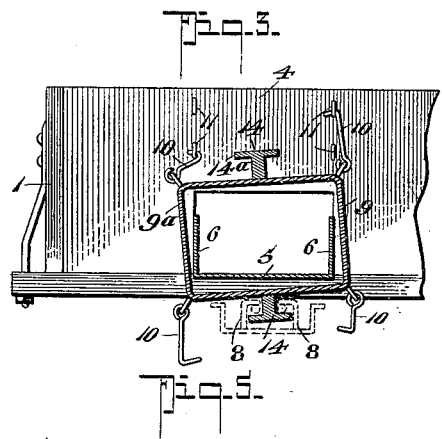
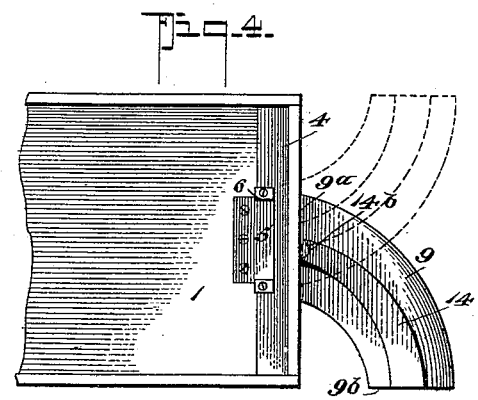
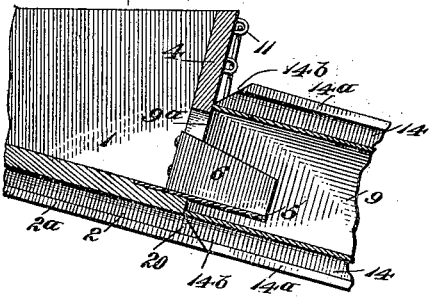
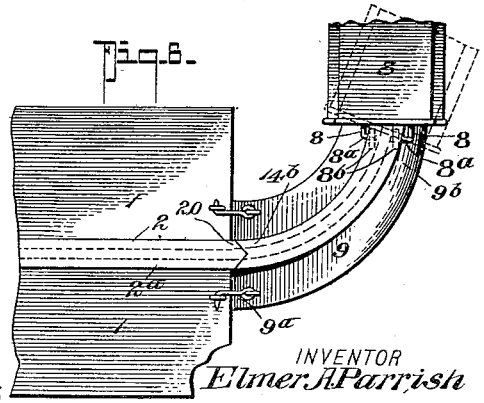
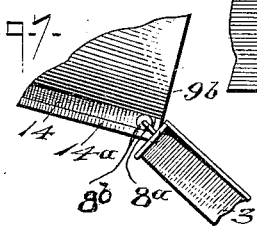
WITNESSES:
H. S. Dieterich
Louis Dieterich
INVENTOR
Elmer A. Parrish
BY
Fred G. Dieterich & Co
ATTORNEYS
THE NORRIS PETERS CO., PHOTO-LITHO., WASHINGTON, D. C.

UNITED STATES PATENT OFFICE.

ELMER A. PARRISH, OF BALTIMORE, MARYLAND, ASSIGNOR TO THOMAS J. GROGAN, OF WASHINGTON, DISTRICT OF COLUMBIA.

DUMPING CART OR WAGON.

SPECIFICATION forming part of Letters Patent No. 623,819, dated April 25, 1899.

Application filed March 16, 1899. Serial No. 709,325. (No model.)

*To all whom it may concern:*

Be it known that I, ELMER A. PARRISH, residing at Baltimore city, State of Maryland, have invented certain new and useful Improvements in Dumping Carts or Wagons, of which the following is a specification.

This invention relates particularly to that class of dumping carts or wagons now in common use in large cities for delivering coal direct from the cart into the receiving vault or cellar, in which the wagon-body or cart is equipped with suitable mechanism to facilitate the operation of running the coal down the chute or incline.

As ordinarily constructed such carts must be placed crosswise of or obliquely to the line of travel of the street, which is objectionable, for the reason that it blocks up the roadway and requires a considerable time to properly back the team and move the cart or wagon up to the street-curb. Improvements have heretofore been provided in the nature of supplemental chuteways capable of being used with a chute member slidable under the cart and so arranged as to project at desired angles from the cart; but, so far as I know, improvements of this character involve a special construction of the cart or chuteway so materially different from the ordinary or common form of chute-wagon and chute as to require a special construction of the wagon-body, particularly as to the end-gate portion thereof.

Primarily my invention seeks to provide an attachment, as it were, for the common form of chute-cart now in general use, whereby the cart or wagon can be driven up directly in line with the street-curb instead of at right angles or obliquely thereto and the coal discharged at either side at right angles or obliquely, as may be most desirable.

Another object of my invention is to provide an attachment for the ordinary form of chute carts or wagons adapted to be detachably and reversibly secured to the outlet in the tail-gate, whereby to discharge the coal in either direction laterally, said attachment also having suitable guideways whereby to facilitate the ready pushing of the main chute member under the wagon or cart body without disconnecting the attachment.

In its subordinate features my invention comprises certain details of construction and peculiar combination of parts, all of which will be first described, and then particularly set out in the appended claims, reference being had to the accompanying drawings, in which—

Figure 1 is a view of the rear end of a chute wagon or cart equipped with my invention. Fig. 2 is a side elevation thereof. Fig. 3 is a detail transverse section taken practically on the line 3 3 of Fig. 1. Fig. 4 is a plan view of the delivery end of the wagon, illustrating the reverse adjustment of my elbow attachment. Fig. 5 is a detail longitudinal section illustrating the manner of joining the chute-guide-flange members hereinafter referred to; and Fig. 6 is a detail inverted plan of the end of the wagon, the deflector-elbow, and a portion of the chute, showing the guide members the more clearly. Fig. 7 is a detail view hereinafter referred to.

Referring now to the accompanying drawings, in which like numerals indicate like parts in all the figures, 1 indicates the wagon or cart body, which is intended to illustrate the common form of chute wagon or cart most generally used and which has the longitudinal rail or guide 2 on its bottom, on which the ordinary chute member 3 is held to freely slide and on which it is supported when not extended for use, it being understood that my improvements are of such nature and shape intended to be applied to the ordinary chute wagon or cart without requiring any change of construction thereof.

4 indicates the tail-gate, and 5 the tail chute-piece, which has its bottom flush with the wagon-bottom and is provided with side guide members 6, which in the drawings are shown to project over the sides of a right-angle discharge-opening, it being understood that when the discharge-opening is of round or other shape the guide 6 will have a corresponding shape.

In the drawings I have shown the wagon-body provided with a longitudinal cleat 2, fastened directly against the bottom, and said cleat has horizontal flanges $2^a$; but instead of connecting the chute-guide as thus shown it may consist of two rods, as indicated in dotted lines in Fig. 3, with which the supporting-fingers 8, which project up from the inner end of the chute, are adapted to engage. To facilitate the handling of the chute to shove it in or pull it out for operation, the fingers 8 have inturned members 8ª, carrying friction-rollers 8ᵇ to engage the flanges 2ª.

9 indicates what I term a "deflector-elbow," the construction of which and its combination with the chute and end portions of the wagon form the essential features of this invention. At this point I deem it proper to mention that I am aware that chute-wagons having a rotary elbow fixedly held over the discharge of the wagon have been provided, but the same is of such nature as to require a special construction of cart or wagon body and a special means for supporting the chute, and the same cannot be secured to the ordinary form of chute wagon or cart without materially changing the construction of the end portions thereof. My improved deflector-elbow is intended to be detachably mounted over the discharge-opening of the ordinary chute wagon or cart, and to permit its use therewith it is only necessary to secure several staples over the discharge-opening of the cart or wagon from which to suspend my improved deflector-elbow.

The deflector-elbow 9 may have its inner or mouth portion 9ª made of a shape to correspond with the discharge-opening in the wagon end; but I prefer to make the receiving end of right-angle shape, whereby the same will have a more solid bearing against the wagon end. The discharge end 9ᵇ of the deflector-elbow may be round, as shown in the drawings, or of other desired shape.

To the four corners of the mouth of the elbow member 9 are secured hook-rods or chains 10, adapted to have their free ends detachably hooked or linked in the staples 11, appropriately secured to the wagon end. It will be noticed that a pair of staples 11 are arranged on each side of the discharge-opening, and each pair is held in a vertical plane. The purpose of this will be readily apparent by reference to Fig. 3, from which it will be seen that when supporting the deflector-elbow to discharge to the left the chain or hook-rod at the left is connected with the lower main staple 11, while the opposite rod or chain is suspended from the upper staple on the corresponding side of the discharge-opening of the wagon, thereby giving the deflector-elbow the proper cant to the left to facilitate the discharge of the coal out through the elbow on the chute 3, it being obvious that when the member 9 is held in a reverse direction—that is, discharging toward the right—the manner of suspending the same is reversed.

One of the advantages in using the ordinary form of chute-wagon is that the connection of the chute with the wagon-body is such that the same can be quickly pulled out to a proper position and as quickly shoved back after the load has been discharged. Heretofore when means have been provided for discharging the coal in a lateral direction to the wagon-body instead of directly rearward special means for connecting different chute members has been provided, and their use has been found objectionable for the reason that special means for connecting the chute members must be had, which requires considerable time on the part of the attendant to properly set them in position for operation. To provide for placing the chute in position the same as when used with the ordinary wagon and without any extra time, I form the upper and lower faces of the elbow with curved guides 14, which have lateral flanges 14ª, and these guide members are adapted to be alternately brought in line with the guide 2 on the bottom of the wagon and form practically a continuation of the same, the said guide members 14 having their ends provided with interlocking portions 14ᵇ, whereby to engage with similar interlocking portions 20 on the guides 2 to produce a proper continuity of said guide members. It will thus be seen that in withdrawing the chute the operator can pull the same freely out to the extremity of the discharge end of the elbow, and to admit of the said chute being deflected in the direction obliquely to the discharge end of the said elbow the flanges 14ª are made of sufficient width to permit the rollers to have a sufficient lateral play thereon to allow the chute to be swung obliquely, as will be clearly understood by reference to Fg. 6. By forming the opposite faces of the elbow with a guide-piece it is obvious that when turned to either direction a combination of the guide with the chute is provided. Furthermore, by curving the guide, as stated, after the load has been discharged the operator need only push the chute back the same as in the ordinary wagon without requiring any additional time.

From the foregoing, taken in connection with the accompanying drawings, it is thought the advantages and operation of my improvement will be readily apparent. It will be observed that the same may be readily fitted on the ordinary form of chute cart or wagon, and it is capable of very economical construction, and its use will avoid the necessity of backing the team, as is now required in the use of the ordinary chute cart or wagon.

It will be understood that when the end portion of the wagon has a projecting tail chute-piece, as indicated by 5, the side members 6 thereof form means for steadying the deflector-elbow and holding it to a proper position.

To hold the chute from pulling out from the deflector 9, the ends of the guide-flanges 14ª are turned to form stops, as shown in Fig. 7, and to hold the lower end of the deflector secure the same is made fast by hooks and staples, as shown in Fig. 6.

Having thus described my invention, what I claim, and desire to secure by Letters Patent, is—

1. An attachment for chute wagons or carts having a chute supported from and longitudinally slidable on the bottom; of a deflector for shooting the wagon contents laterally from the end thereof, adapted to be detachably secured over the discharge end of the wagon, said deflector having means for guiding the outwardly-sliding movement of the chute and supporting the inner end thereof, substantially as shown and described.

2. The combination with a chute-wagon having a chute supported on and longitudinally slidable on the bottom; of an elbow-deflector reversibly and detachably mounted over the discharge-opening, said deflector having guide and supporting members on its top and bottom faces adapted to be alternately brought into register with the chute-guide on the wagon-body and forming a continuation thereof, as specified.

3. An attachment for chute-wagons, consisting of an elbow member adapted to be reversibly and detachably attached to the end of the wagon over its discharge; means for supporting it on the wagon, said deflector having a pendent lateral flange supporting-guide and a chute having hooked fingers adapted to engage the flanges of the deflector-guide, substantially as shown and described.

4. In a chute cart or wagon; an elbow-deflector adapted to be detachably and reversibly secured upon the end of the wagon, said deflector having a guide 14, formed with lateral flanges, the outer ends of said flanges being extended; and a chute having upwardly-projecting fingers 8, terminating in hook members, said members carrying friction-rollers, said rollers being adapted to engage the lateral flanges of the guide 14, and held for lateral adjustment thereon, whereby the chute may be extended obliquely to the discharge end of the deflector, substantially as shown and for the purposes described.

5. The combination with the wagon having the flanged guide 2, on the under side terminating at the end thereof and the chute 3, having upwardly-projecting fingers 8, terminating in hook members adapted to engage the flange-guide 2; of the deflector-elbow detachably and reversibly supported on the rear end of the wagon over its discharge, said elbow having curved guide members upon its upper and lower faces, said guide members having interlocking ends adapted to engage the outer ends of the guides 2, whereby to form a continuation thereof, substantially as shown and for the purposes described.

ELMER A. PARRISH.

Witnesses:
THOMAS J. GROGAN,
WM. MENIKEN.